United States Patent
Luo et al.

(10) Patent No.: US 9,667,376 B2
(45) Date of Patent: May 30, 2017

(54) TRAFFIC-BEARING ENTITY IDENTIFICATION IN MULTIPLE-WAVELENGTH PASSIVE OPTICAL NETWORKS (PONS)

(71) Applicant: Futurewei Technologies, Inc., Plano, TX (US)

(72) Inventors: Yuanqiu Luo, Cranbury, NJ (US); Frank Effenberger, Colts Neck, NJ (US); Bo Gao, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/460,892

(22) Filed: Aug. 15, 2014

(65) Prior Publication Data
US 2015/0050024 A1    Feb. 19, 2015

Related U.S. Application Data

(60) Provisional application No. 61/866,895, filed on Aug. 16, 2013.

(51) Int. Cl.
*H04J 14/02* (2006.01)
*H04B 10/27* (2013.01)
*H04J 14/00* (2006.01)

(52) U.S. Cl.
CPC .......... *H04J 14/0227* (2013.01); *H04B 10/27* (2013.01); *H04J 14/0258* (2013.01); *H04J 14/0267* (2013.01); *H04J 14/0282* (2013.01)

(58) Field of Classification Search
CPC . H04J 14/0227; H04J 14/0282; H04J 14/0267
USPC ................................................ 398/68, 66, 43
See application file for complete search history.

(56) References Cited

U.S. PATENT DOCUMENTS

| | | | | |
|---|---|---|---|---|
| 8,873,957 | B2 * | 10/2014 | Tanaka | H04B 10/272 398/58 |
| 9,178,713 | B1 * | 11/2015 | Johnston | H04L 7/0075 |
| 2004/0120326 | A1 * | 6/2004 | Yoon | H04L 12/467 370/395.53 |
| 2004/0208631 | A1 * | 10/2004 | Song | H04J 3/1694 398/168 |

(Continued)

FOREIGN PATENT DOCUMENTS

WO        2012136155 A1    10/2012

OTHER PUBLICATIONS

McGarry, M., et al., "An Evolutionary WDM Upgrade for EPONs," Retrieved from the Internet: URL:http://mre.faculty.asu.edu/EPONupgrade.pdf, retrieved on Apr. 29, 2014, Jan. 1, 2005, 24 pages.

(Continued)

*Primary Examiner* — Oommen Jacob
(74) *Attorney, Agent, or Firm* — Conley Rose, P.C.

(57) ABSTRACT

An optical line terminal (OLT) comprises a receiver configured to receive a first message, a processor coupled to the receiver and configured to process the first message, and generate a second message based on the first message, wherein the second message comprises an identification (ID) structure identifying a traffic-bearing entity associated with an optical network unit (ONU), and wherein the ID structure comprises a wavelength ID field, and a transmitter coupled to the processor and configured to transmit the second message.

22 Claims, 6 Drawing Sheets

(56) References Cited

U.S. PATENT DOCUMENTS

| | | | |
|---|---|---|---|
| 2005/0058135 A1* | 3/2005 | Sisto | H04L 12/5695 370/395.2 |
| 2005/0286500 A1* | 12/2005 | Minami | H04L 29/06027 370/352 |
| 2006/0039390 A1* | 2/2006 | Boyd | H04L 12/4641 370/404 |
| 2006/0222365 A1* | 10/2006 | Jung | H04J 14/0226 398/72 |
| 2007/0019957 A1* | 1/2007 | Kim | H04Q 11/0067 398/72 |
| 2007/0092256 A1* | 4/2007 | Nozue | H04J 14/0282 398/72 |
| 2007/0230481 A1* | 10/2007 | Ikeda | H04L 12/2856 370/395.53 |
| 2007/0248109 A1* | 10/2007 | DeCarolis | H04J 3/1694 370/412 |
| 2008/0089685 A1* | 4/2008 | Kazawa | H04J 3/0682 398/66 |
| 2008/0198857 A1* | 8/2008 | Kim | H04Q 11/0067 370/401 |
| 2008/0205443 A1* | 8/2008 | Shi | H04Q 11/0067 370/468 |
| 2008/0279549 A1* | 11/2008 | Kazawa | H04B 10/0773 398/17 |
| 2008/0279554 A1* | 11/2008 | Kazawa | H04J 3/1694 398/69 |
| 2008/0304828 A1* | 12/2008 | Mizutani | H04B 1/707 398/78 |
| 2009/0226170 A1* | 9/2009 | Zou | H04J 3/1694 398/79 |
| 2009/0304385 A1* | 12/2009 | Khermosh | H04J 14/0282 398/58 |
| 2010/0208747 A1* | 8/2010 | Gordon | H04J 3/1694 370/468 |
| 2010/0239255 A1* | 9/2010 | Ikeda | H04J 3/1694 398/66 |
| 2011/0085799 A1* | 4/2011 | Mizutani | H04Q 11/0067 398/37 |
| 2011/0242974 A1* | 10/2011 | Das | H04L 47/781 370/230 |
| 2011/0305455 A1* | 12/2011 | Helleberg Andersen | H04J 14/00 398/41 |
| 2011/0320549 A1* | 12/2011 | Ohyama | H04L 67/18 709/206 |
| 2012/0051371 A1* | 3/2012 | Sarashina | H04J 3/1694 370/468 |
| 2012/0163817 A1* | 6/2012 | Kwon | H04L 12/2861 398/63 |
| 2013/0045011 A1* | 2/2013 | Zhang | H04J 3/1694 398/58 |
| 2013/0236170 A1* | 9/2013 | Nishitani | H04L 12/2861 398/25 |
| 2014/0133859 A1* | 5/2014 | Fang | H04Q 11/0067 398/76 |
| 2015/0050024 A1* | 2/2015 | Luo | H04B 10/27 398/68 |

OTHER PUBLICATIONS

"Series G: Transmission Systems and Media, Digital Systems and Network, Digital Sections and digital line system—Optical Line system for local and access networks, 10-Gigabit-capable passive optical network (XG-PON) systems: Definitions, abbreviations and acronyms," ITU-T, G.987, Jun. 2012, 26 pages.

Foreign Communication From A Counterpart Application, PCT Application No. PCT/US2014/051281, International Search Report dated Oct. 31, 2014, 5 pages.

Foreign Communication From A Counterpart Application, PCT Application No. PCT/US2014/051281, Written Opinion dated Oct. 31, 2014, 7 pages.

"Series G: Transmission Systems and Media, Digital Systems and Networks—Digital Sections and Digital Line System—Optical Line Systems for Local and Access Networks—10-Gigabit-Capable Passive Optical Networks (XG-PON): Transmission Convergence (TC) Layer Specification," ITU-T, G.987.3, Oct. 2010, 134 pages.

"IEEE Standard for Ethernet, Section 5", IEEE Std 802.3-2012, 2012, 844 pages.

Effenberger, et al., "TWDM Protocol Design Impact of DWBA," FSAN Meeting, Bad Nauheim, Germany, Aug. 2013, 14 pages.

"Draft New Recommendation ITU-T G.989.3," Study Group 15, TD 200 Rev.1 (PLEN/15), Mar. 24-Apr. 4, 2014, 164 pages.

* cited by examiner

TRAFFIC-BEARING ENTITY IDENTIFICATION IN MULTIPLE-WAVELENGTH PASSIVE OPTICAL NETWORKS (PONS)

CROSS-REFERENCE TO RELATED APPLICATIONS

This application claims priority to U.S. provisional patent application No. 61/866,895 filed Aug. 16, 2013 by Yuanqiu Luo, et al., and titled "Traffic-Bearing Entity Identification in Multiple-Wavelength Passive Optical Networks," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over the last mile, which is the final portion of a telecommunications network that delivers communication to customers. A PON is a point-to-multipoint (P2MP) network comprised of an optical line terminal (OLT) at a central office (CO), an optical distribution network (ODN), and optical network units (ONUs) at the user premises. PONs may also comprise remote nodes (RNs) located between the OLTs and the ONUs, for instance at the end of a road where multiple customers reside.

In recent years, time-division multiplexing (TDM) PONs such as gigabit-capable PONs (GPONs) and Ethernet PONs (EPONs) have been deployed worldwide for multimedia applications. In TDM PONs, the total capacity is shared among multiple users using a time-division multiple access (TDMA) scheme, so the average bandwidth for each user may be limited to below 100 megabits per second (Mb/s).

Wavelength-division multiplexing (WDM) PONs are considered a very promising solution for future broadband access services. WDM PONs can provide high-speed links with dedicated bandwidth up to 10 gigabits per second (Gb/s). By employing a wavelength-division multiple access (WDMA) scheme, each ONU in a WDM PON is served by a dedicated wavelength channel to communicate with the CO or the OLT. Next-generation PONs (NG-PONs) and NG-PON2s may include point-to-point WDM PONs (P2P-WDM PONs), which may provide data rates higher than 10 Gb/s.

NG-PONs and NG-PON2s may also include time- and wavelength-division multiplexing (TWDM) PONs, which may also provide data rates higher than 10 Gb/s. TWDM PONs may combine TDMA and WDMA to support higher capacity so that an increased number of users can be served by a single OLT with sufficient bandwidth per user. In a TWDM PON, a WDM PON may be overlaid on top of a TDM PON. In other words, different wavelengths may be multiplexed together to share a single feeder fiber, and each wavelength may be shared by multiple users using TDMA.

SUMMARY

In one embodiment, the disclosure includes an OLT comprising a receiver configured to receive a first message, a processor coupled to the receiver and configured to process the first message, and generate a second message based on the first message, wherein the second message comprises an identification (ID) structure identifying a traffic-bearing entity associated with an ONU, and wherein the ID structure comprises a wavelength ID field, and a transmitter coupled to the processor and configured to transmit the second message.

In another embodiment, the disclosure includes an ONU comprising a transmitter configured to transmit a first message, a receiver configured to receive a second message based on the first message, and a processor coupled to the transmitter and the receiver and configured to process the second message, wherein the second message comprises an ID structure identifying a traffic-bearing entity associated with the ONU, and wherein the ID structure comprises a wavelength ID field.

In yet another embodiment, the disclosure includes a method comprising transmitting a first message, receiving a second message based on the first message, processing the second message, wherein the second message comprises an ID structure identifying a traffic-bearing entity associated with an ONU, and wherein the ID structure comprises a wavelength ID field identifying an upstream wavelength at which the traffic-bearing entity can transmit, and transmitting, via the traffic-bearing entity, a third message at the upstream wavelength.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

NG-PONs and NG-PON2s, including multiple-wavelength PONs such as WDM PONs, P2P-WDM PONs, and TWDM PONs, may have multiple advantages compared to prior PON technologies. For instance, the ONUs, or traffic-bearing entities associated with the ONUs, may tune to receive and transmit at any available wavelength. A traffic-bearing entity may be an ONU object representing a group of logical connections that appear as a single entity for the purpose of upstream bandwidth assignment in the PON. Also, the OLT may manage the multiple wavelengths. In a TWDM PON, both a timeslot and a wavelength channel may identify an ONU upstream transmission opportunity. Upstream may refer to the direction of communication from an ONU to the OLT. Downstream, on the other hand, may refer to the direction of communication from the OLT to the ONU. The OLT may send to the ONUs messages that comprise information to identify a transmission opportunity. The OLT may assign transmission opportunities in a way that avoids collision among transmissions from the ONUs. The OLT may group transmission opportunities for each of the OLT's ports. Existing message formats may not, however, identify wavelengths and thus the channels corresponding to those wavelengths.

Disclosed herein are embodiments for identifying a traffic-bearing entity. Specifically, the OLT may provide a transmission allocation for each traffic-bearing entity. The transmission allocation may, in turn, comprise an ID structure comprising a wavelength ID field, an ONU-ID field, and a traffic-bearing entity ID field. For G-PONs, 10-gigabit-capable PONs (XG-PONs), and other PONs, the ID structure may be an Alloc-ID and may comprise a wavelength ID field, an ONU-ID field, and a transmission container (T-CONT) ID field corresponding to the traffic-bearing entity ID field. In other words, for those PONs, a traffic-bearing entity may be referred to as a T-CONT. For EPONs, 10-gigabit-capable EPONs (10G-EPONs), and other PONs, the ID structure may be an LLID and may comprise a wavelength ID field, an ONU-ID field, and a traffic port or flow ID field corresponding to the traffic-bearing entity ID field. In other words, for those PONs, a traffic-bearing entity may be referred to as a traffic port or flow. In each case, the ID structure may therefore comprise a wavelength ID field. The wavelength ID may be either a logical identification or a literal, or actual, identification of a wavelength or a channel associated with the wavelength. The identified wavelength may be an upstream wavelength that a traffic-bearing entity may transmit at. The OLT may form the ID structure in the media access control (MAC) layer, and the ONU may process the ID structure in the MAC layer. The disclosed embodiments may apply to any multiple-wavelength networks. While Alloc-IDs and LLIDs are specifically discussed, the disclosed embodiments may apply to any transmission allocations and ID structures.

Figure 1:
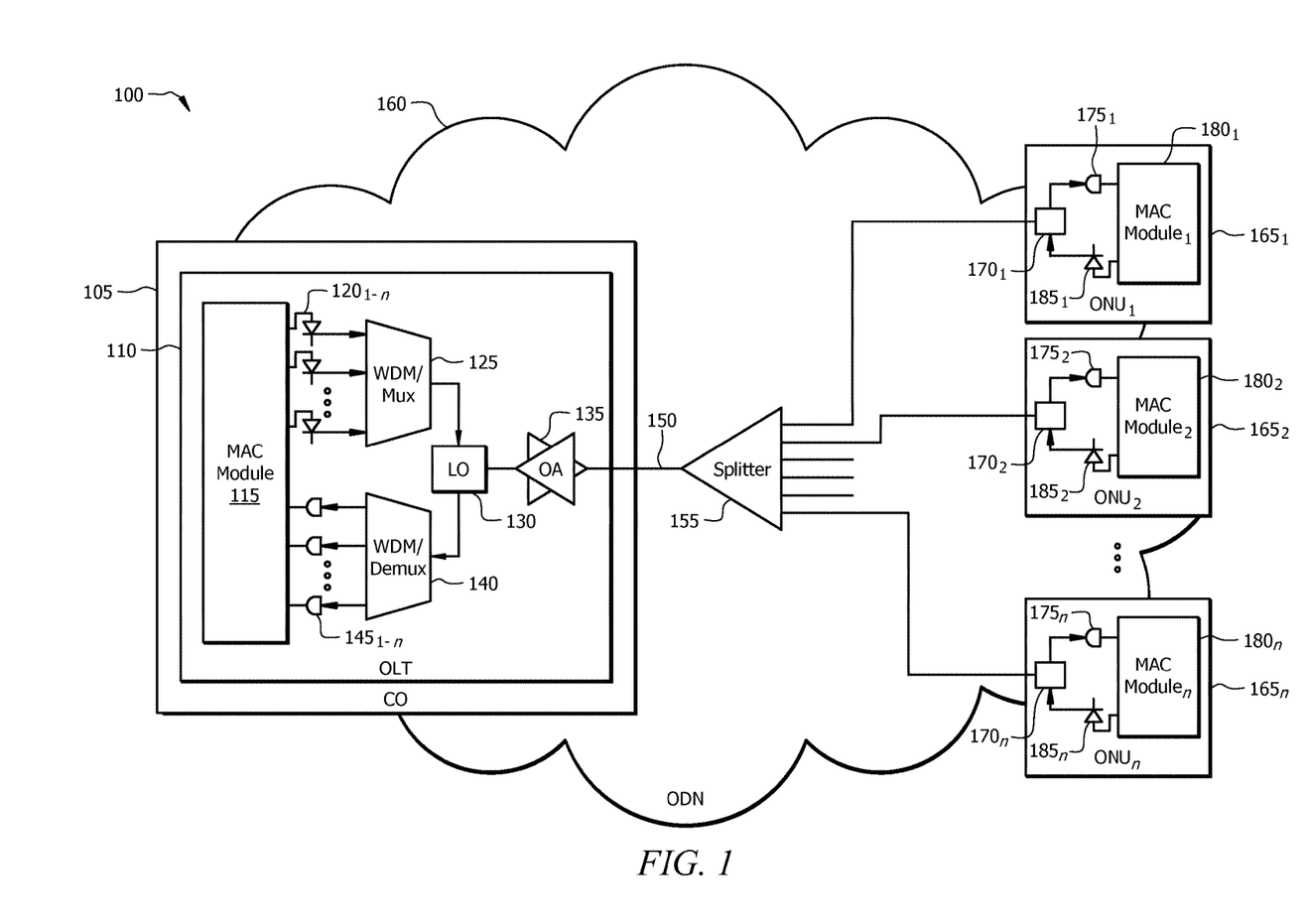
FIG. 1 is a schematic diagram of a PON.

FIG. 1 is a schematic diagram of a PON 100. The PON 100 may be suitable for implementing the disclosed embodiments. The PON 100 may comprise an OLT 110 located in a central office (CO) 105, $ONUs_{1-n}$ $165_{1-n}$ located at the customer premises, and an optical distribution network (ODN) 160 that couples the OLT 110 to the $ONUs_{1-n}$ $165_{1-n}$. N may be any positive integer.

The PON 100 may be a communications network that does not require any active components to distribute data between the OLT 110 and the $ONUs_{1-n}$ $165_{1-n}$. Instead, the PON 100 may use passive optical components in the ODN 160 to distribute data between the OLT 110 and the $ONUs_{1-n}$ $165_{1-n}$. The PON 100 may adhere to any standard related to multiple-wavelength PONs.

The CO 105 may be a physical building and may comprise servers and other backbone equipment designed to service a geographical area with data transfer capability. The CO 105 may comprise the OLT 110, as well as additional OLTs. If multiple OLTs are present, than any suitable access scheme may be used among them.

The OLT 110 may be any device configured to communicate with the $ONUs_{1-n}$ $165_{1-n}$ and another network. Specifically, the OLT 110 may act as an intermediary between the other network and the $ONUs_{1-n}$ $165_{1-n}$. For instance, the OLT 110 may forward data received from the network to the $ONUs_{1-n}$ $165_{1-n}$ and may forward data received from the $ONUs_{1-n}$ $165_{1-n}$ to the other network. When the other network uses a network protocol that differs from the PON protocol used in the PON 100, the OLT 110 may comprise a converter that converts the network protocol to the PON protocol. The OLT 110 converter may also convert the PON protocol into the network protocol. Though the OLT 110 is shown as being located at the CO 105, the OLT 110 may be located at other locations as well.

The OLT 110 may comprise an MAC module 115, $transmitters_{1-n}$ $120_{1-n}$, a WDM/mux 125, a local oscillator (LO) 130, a bi-directional optical amplifier (OA) 135, a WDM/demux 140, and $receivers_{1-n}$ $145_{1-n}$ coupled together as shown in FIG. 1. The MAC module 115 may be any module suitable for processing signals for use at a physical layer in a protocol stack. Specifically, the MAC module 115 may process the signals using channel access control mechanisms, which are described below. After processing the signals, the MAC module 115 may instruct the $transmitters_{1-n}$ $120_{1-n}$ to transmit those signals. The $transmitters_{1-n}$ $120_{1-n}$ may comprise tunable lasers or other devices suitable for converting electrical signals into optical signals and transmitting the optical signals on separate wavelength channels to the WDM/mux 125. The WDM/mux 125 may be any suitable wavelength multiplexer, such as an arrayed waveguide grating (AWG). The WDM/mux 125 may multiplex the wavelength channels and thus combine the signals into a combined transmitted signal, then forward the combined transmitted signal to the LO 130. The LO 130 may add characteristics to the combined transmitted signal in order for the $ONUs_{1-n}$ $165_{1-n}$ to properly extract the signals. The LO 130 may then forward the combined transmitted signal to the OA 135, which may amplify the combined transmitted signal as needed in order to forward the combined transmitted signal to a splitter 155. The OA 135 may also receive a combined received signal from the splitter 155 and amplify the combined received signal as needed in order to forward the combined received signal to the WDM/demux 140. The WDM/demux 140 may be similar to the WDM/mux 125 and may demultiplex the combined received signal into multiple optical signals, then forward the multiple optical signals to the $receivers_{1-n}$ $145_{1-n}$. The $receivers_{1-n}$ $145_{1-n}$ may comprise photodiodes or other devices suitable for converting optical signals into electrical signals and forwarding the electrical signals to the MAC module 115 for further processing.

The splitter 155 may be any device suitable for splitting the combined optical signals and forwarding the split signals to the $ONUs_{1-n}$ $165_{1-n}$. The splitter 155 may also be any device suitable for receiving signals from the $ONUs_{1-n}$ $165_{1-n}$, combining those signals into a combined received signal, and forwarding the combined received signal to the OA 135. The splitter 155 may be an active splitter or a passive splitter. The splitter 155 may be located at a remote node or closer to the CO 105 as needed.

The ODN 160 may be any suitable data distribution system, which may comprise optical fiber cables such as the optical fiber cable 150, couplers, splitters, distributors, or other equipment. The optical fiber cables, couplers, splitters, distributors, or other equipment may be passive optical components and therefore not require any power to distribute data signals between the OLTs 110 and the ONUs$_{1-n}$ 165$_{1-n}$. Alternatively, the ODN 160 may comprise one or more active components such as optical amplifiers or splitters such as the splitter 155. The ODN 160 may typically extend from the OLTs 110 to the ONUs$_{1-n}$ 165$_{1-n}$ in a branching configuration as shown, but the ODN 160 may be configured in any suitable P2MP configuration.

The ONUs$_{1-n}$ 165$_{1-n}$ may be any devices suitable for communicating with the OLT 110 and a customer. Specifically, the ONUs$_{1-n}$ 165$_{1-n}$ may act as an intermediary between the OLT 110 and the customer. For instance, the ONUs$_{1-n}$ 165$_{1-n}$ may forward data received from the OLT 110 to the customer and forward data received from the customer to the OLT 110. The ONUs$_{1-n}$ 165$_{1-n}$ may be similar to optical network terminals (ONTs), so the terms may be used interchangeably. The ONUs$_{1-n}$ 165$_{1-n}$ may typically be located at distributed locations such as the customer premises, but may be located at other locations as well.

The ONUs$_{1-n}$ 165$_{1-n}$ may comprise diplexers$_{1-n}$ 170$_{1-n}$, receivers$_{1-n}$ 175$_{1-n}$, MAC modules$_{1-n}$ 180$_{1-n}$, and transmitters$_{1-n}$ 185$_{1-n}$ coupled together as shown. The diplexers$_{1-n}$ 170$_{1-n}$ may forward the downstream signals from the splitter 155 to the receivers$_{1-n}$ 175$_{1-n}$, and forward upstream signals from the transmitters$_{1-n}$ 185$_{1-n}$ to the splitter 155. The receivers$_{1-n}$ 175$_{1-n}$, the MAC modules$_{1-n}$ 180$_{1-n}$, and the transmitters$_{1-n}$ 185$_{1-n}$ may function in a manner similar to the receivers$_{1-n}$ 145$_{1-n}$, the MAC module 115, and the transmitters$_{1-n}$ 120$_{1-n}$ in the OLT 110, respectively.

The PON 100 may provide WDM capability by associating a downstream wavelength with each transmitter$_{1-n}$ 120$_{1-n}$ and an upstream wavelength with each receiver$_{1-n}$ 145$_{1-n}$ in the OLT 110 so that a plurality of wavelengths is present. The PON 100 may then combine those wavelengths into a single optical fiber cable 150 and distributing the wavelengths to the ONUs$_{1-n}$ 165$_{1-n}$ through a splitter 155. The PON 100 may provide TDM as well.

Figure 2:
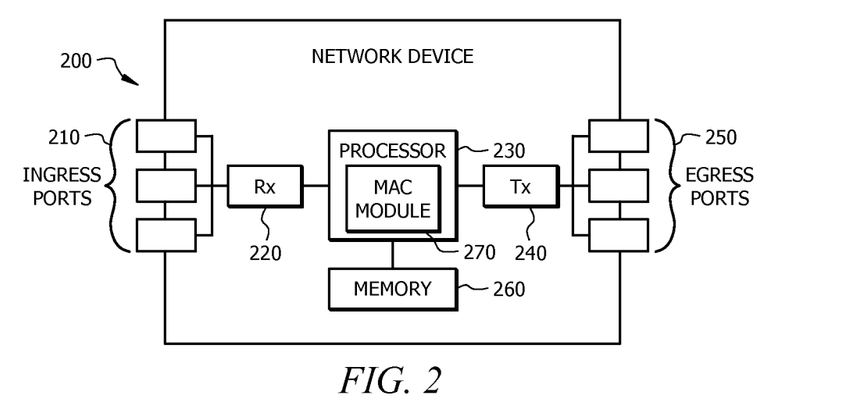
FIG. 2 is a schematic diagram of a network device.

FIG. 2 is a schematic diagram of a network device 200. The network device 200 may be suitable for implementing the disclosed embodiments, for instance the OLT 110 and the ONUs$_{1-n}$ 165$_{1-n}$. The network device 200 may comprise ingress ports 210 and receiver units (Rx) 220 for receiving data; a processor, logic unit, or central processing unit (CPU) 230 to process the data; transmitter units (Tx) 240 and egress ports 250 for transmitting the data; and a memory 260 for storing the data. The network device 200 may also comprise optical-to-electrical (OTE) components and electrical-to-optical (ETO) components coupled to the ingress ports 210, receiver units 220, transmitter units 240, and egress ports 250 for egress or ingress of optical or electrical signals.

The processor 230 may be implemented by hardware and software. The processor 230 may be in communication with the ingress ports 210, the receiver units 220, the transmitter units 240, the egress ports 250, and the memory 260. The processor 230 may be implemented as one or more CPU chips, cores (e.g., as a multi-core processor), field-programmable gate arrays (FPGAs), application specific integrated circuits (ASICs), and digital signal processors (DSPs). The processor 230 may comprise an MAC module 270, which may be suitable for implementing the MAC module 115 and the MAC modules$_{1-n}$ 180$_{1-n}$.

The memory 260 may comprise one or more disks, tape drives, and solid-state drives; may be used as an over-flow data storage device; may be used to store programs when such programs are selected for execution; and may be used to store instructions and data that are read during program execution. The memory 260 may be volatile and non-volatile and may be read-only memory (ROM), random-access memory (RAM), ternary content-addressable memory (TCAM), and static random-access memory (SRAM).

Figure 3:
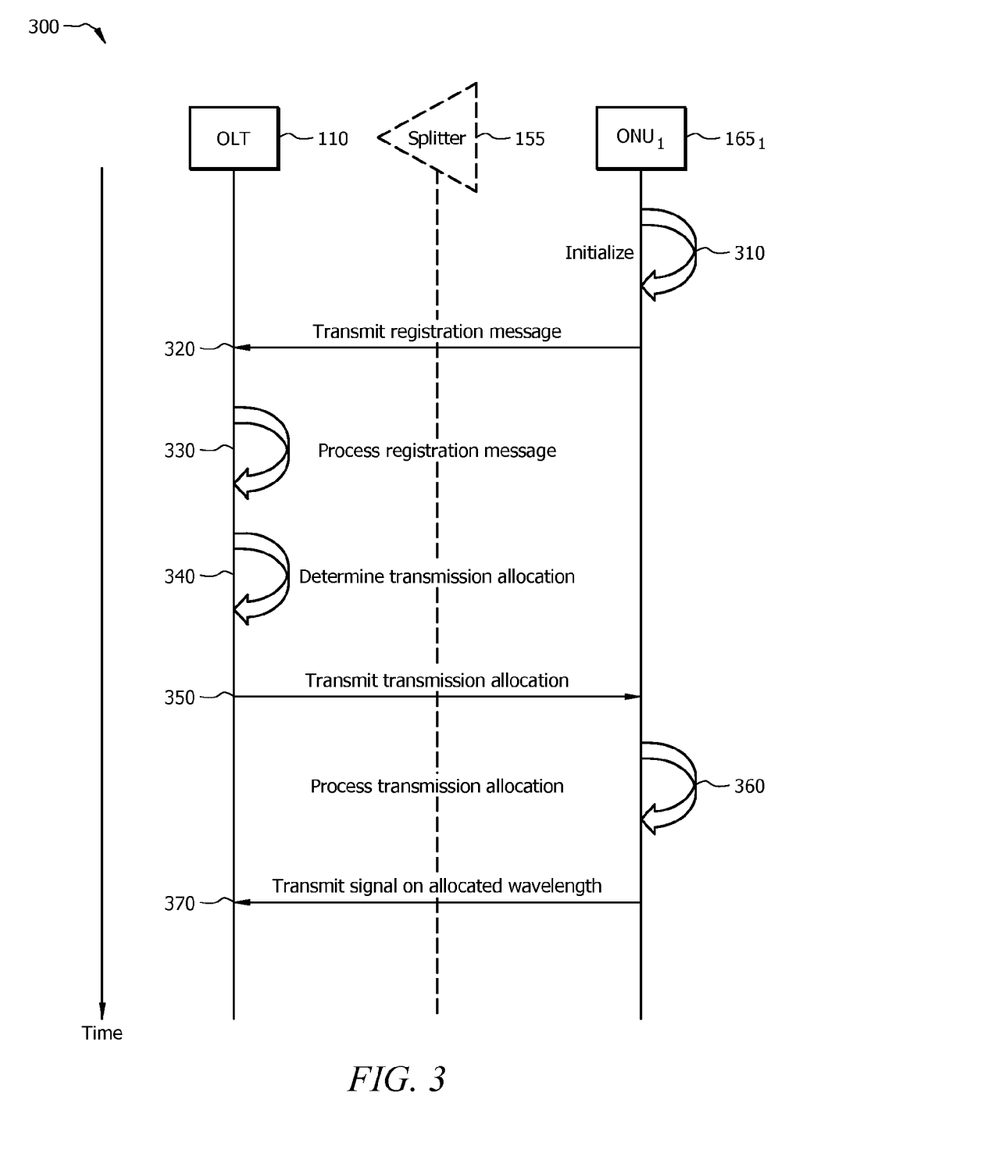
FIG. 3 is a message sequence diagram illustrating transmission allocation.

FIG. 3 is a message sequence diagram 300 illustrating transmission allocation. The PON 100 may implement the allocation. The diagram illustrates messages exchanged between the OLT 110 and the ONU$_1$ 165$_1$, but the same principles may apply between the OLT 110 and any other ONU$_{2-n}$ 165$_{2-n}$.

At step 310, the ONU$_1$ 165$_1$ may initialize. Initialization may comprise self-configuration and ranging to the OLT 110. This may occur, for instance, when a customer turns on the ONU$_1$ 165$_1$. At step 320, the ONU$_1$ 165$_1$ may transmit a registration message to the OLT 110. The registration message may indicate a request for the ONU$_1$ 165$_1$ to transmit and receive signals. The ONU$_1$ 165$_1$ may be designed to transmit registration messages on a specified registration wavelength.

At step 330, the OLT 110 may process the registration message. The processing may include processing the request for the ONU$_1$ 165$_1$ to transmit and receive signals. At step 340, the OLT 110 may determine transmission allocation for the ONU$_1$ 165$_1$. For instance, the transmission allocation may assign downstream reception and upstream transmission wavelengths to the ONU$_1$ 165$_1$. At step 350, the OLT 110 may transmit a transmission allocation to the ONU$_1$ 165$_1$.

At step 360, the ONU$_1$ 165$_1$ may process the transmission allocation. Based on the transmission allocation, the ONU$_1$ 165$_1$ may determine what wavelengths it is to receive and transmit signals at. At step 370, the ONU$_1$ 165$_1$ may transmit a message at its allocated wavelength. Instead of comprising control data like the messages at steps 320 and 350, the message at step 370 may comprise user data. The steps above are described with respect to the OLT 110 and the ONU$_1$ 165$_{1-n}$ but any signals exchanged between the OLT 110 and the ONU$_1$ 165$_1$ may pass through the splitter 155 as shown, as well as other components of the PON 100 as described with respect to FIG. 1 above. The disclosed embodiments may more fully describe the steps above, including steps 340 and 350.

As mentioned above, the transmission allocation may comprise an ID structure. For G-PONs, XG-PONs, and other PONs, the transmission allocation may be a bandwidth map (BWmap), which is defined as "a series of 8-byte allocation structures" in section 8.1.2 of "10-Gigabit-capable passive optical networks (XG-PON): Transmission convergence (TC) layer specification," International Telecommunication Union Telecommunication Standardization Sector (ITU-T) G.987.3, October 2010 ("G.987.3"), which is incorporated by reference. The ID structure may be an Alloc-ID, which is defined in section 6.4.3 of G.987.3 as "a 14-bit number that the OLT assigns to an ONU to identify a traffic-bearing entity that is a recipient of upstream bandwidth allocations within that ONU." Table 1 shows values for Alloc-IDs according to section 6.4.3 of G.987.3.

TABLE 1

Alloc-ID values

| Alloc-ID | Designation | Comment |
|---|---|---|
| 0 . . . 1022 | Default | Default Alloc-ID, which is implicitly assigned with and is equal to the ONU-ID. |

TABLE 1-continued

Alloc-ID values

| Alloc-ID | Designation | Comment |
| --- | --- | --- |
| 1023 | Broadcast | Used by OLT in a serial number grant allocation structure to indicate that any ONU executing the serial number acquisition phase of the activation procedure may use this allocation to transmit a serial number response. |
| 1024 . . . 16383 | Assignable | If more than a single Alloc-ID is needed for an ONU, the OLT assigns additional Alloc-IDs to that ONU by selecting a unique number from this range and communicating it to the ONU using the Assign_Alloc-ID PLOAM message. |

The Alloc-ID value is a 14-bit number that the OLT 110 assigns to an ONU, for instance the $ONU_1$ 165$_1$, to identify a traffic-bearing entity. The default Alloc-ID value is equal to the ONU-ID, which is a 10-bit ID that the OLT 110 assigns to the $ONU_1$ 165$_1$ during activation of the $ONU_1$ 165$_1$. The OLT 110 may assign the ONU-ID using the physical layer operations, administration, and management (PLOAM) messaging channel. Because the ONU-ID is only 10 bits while the Alloc-ID is 14 bits, when the Alloc-ID is the ONU-ID, the Alloc-ID may comprise four additional padding bits. For instance, the Alloc-ID may comprise four "0" bits in the four most significant digits. The default Alloc-ID value may identify the traffic-bearing entity responsible for ONU management and control channel (OMCC) traffic. Other Alloc-ID values may identify traffic-bearing entities responsible for ONU user data traffic. Table 1 shows that the Alloc-ID provides the ONU-ID and a T-CONT ID, which are together sufficient for identifying a traffic-bearing entity in an ONU. The T-CONT ID may be an ID that identifies a T-CONT within the ONU. The ONU-ID may identify the $ONU_1$ 165$_1$. The OLT 110 may assign an Alloc-ID with a value from 1,024 to 16,383 for each non-OMCC traffic-bearing entity in the $ONU_1$ 165$_1$. As a result, if the $ONU_1$ 165$_1$ has, for instance, three non-OMCC traffic-bearing entities, then the OLT 110 may assign to the $ONU_1$ 165$_1$ Alloc-IDs with values 1,024, 1,025, and 1,026.

As discussed above, future PONs may employ WDMA. As a result, it may become necessary to further identify a wavelength in the ID structure. The Alloc-ID may therefore be expressed as $$\text{Alloc-ID}=f\{\text{wavelength ID, ONU-ID, T-CONT ID}\}. \quad (1)$$

As shown in equation 1, the Alloc-ID may be a function of an ONU-ID and a T-CONT, which may be the same as described above. In addition, the Alloc-ID may be a function of a wavelength ID, which may identify an upstream wavelength, or a channel associated with the upstream wavelength, that the T-CONT corresponding to the T-CONT ID may transmit on. When implementing equation 1, a straightforward approach is to segment the Alloc-ID into three fields, a wavelength ID field, an ONU-ID field, and a T-CONT ID field.

Figure 4:
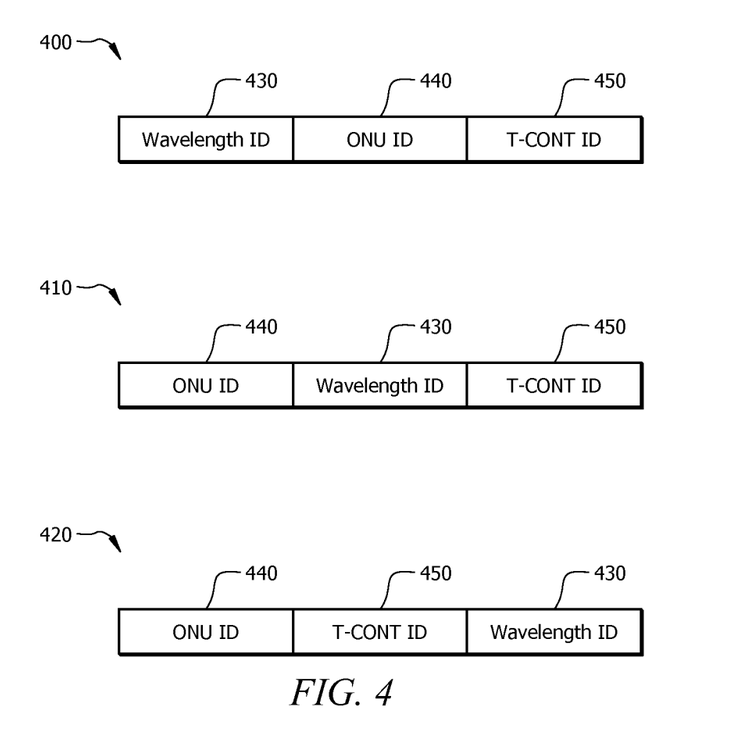
FIG. 4 is a diagram illustrating three allocation identifiers (Alloc-IDs) according to embodiments of the disclosure.

FIG. 4 is a diagram illustrating three Alloc-IDs 400, 410, and 420 according to embodiments of the disclosure. The Alloc-IDs 400, 410, and 420 may be part of a transmission allocation, for instance a BWmap. Each of the Alloc-IDs 400, 410, and 420 may comprise a wavelength ID field 430, an ONU-ID field 440, and a T-CONT ID field 450. The Alloc-ID 400 may comprise the wavelength ID field 430 in a first of three locations, the Alloc-ID 410 may comprise the wavelength ID field 430 in a second of three locations, and the Alloc-ID 420 may comprise the wavelength ID field 430 in a third of three locations. The Alloc-IDs 400, 410, and 420 demonstrate three possible configurations for the wavelength ID field 430, the ONU-ID field 440, and the T-CONT ID field 450, but those fields may be ordered in any other suitable manner. Furthermore, bits of the wavelength ID field 430, the ONU-ID field 440, and the T-CONT ID field 450 may be interleaved among each other. For instance, a first bit, fourth bit, and seventh bit may be associated with the wavelength ID field 430; a second bit, fifth bit, and eighth bit may be associated with the ONU-ID field 440; and a third bit, sixth bit, and ninth bit may be associated with the T-CONT ID field 450. The wavelength ID field 430 may be three bits in order to support eight wavelengths, or the wavelength ID field 430 may be less or more than three bits in order to support less or more than eight wavelengths. The Alloc-IDs 400, 410, and 420 may remain 14 bits, may be more than 14 bits in order to accommodate the addition of the wavelength ID field 430, or may be less than 14 bits.

For EPONs, 10G-EPONs, and other PONs, the transmission allocation may be a transmission window, which is defined as a grant in Institute of Electrical and Electronics Engineers (IEEE) 802.3-2012, Section Five, Jun. 28, 2013 ("802.3-2012"), which is incorporated by reference. The ID structure may be an LLID as provided in section 65.1.3.3.2 of 802.3-2012. To employ WDMA in those PONs, it may become necessary to further identify a wavelength in the ID structure. When the $ONU_1$ 165$_1$ comprises only one traffic port or flow, which may be analogous to a T-CONT, the LLID may therefore be expressed as $$\text{LLID}=f\{\text{wavelength ID, ONU-ID}\}. \quad (2)$$

As shown in equation 2, the LLID may be a function of an ONU-ID, which may be the same as or similar to the ONU-ID described above. In addition, the LLID may be a function of a wavelength ID, which may be the same as or similar to the wavelength ID described above. When the $ONU_1$ 165$_1$ comprises multiple traffic ports or flows, the $ONU_1$ 165$_1$ may receive multiple LLIDs, each of which may be expressed as $$\text{LLID}=f\{\text{wavelength ID, ONU-ID, traffic port or flow ID}\}. \quad (3)$$

As shown in equation 3, the LLID may be a function of a traffic port or flow ID, which may be the same as or similar to the T-CONT ID described above. When implementing equation 3, a straightforward approach is to segment the LLID into two or three fields, a wavelength ID field, an ONU-ID field, and an optional traffic port or flow field.

Figure 5:
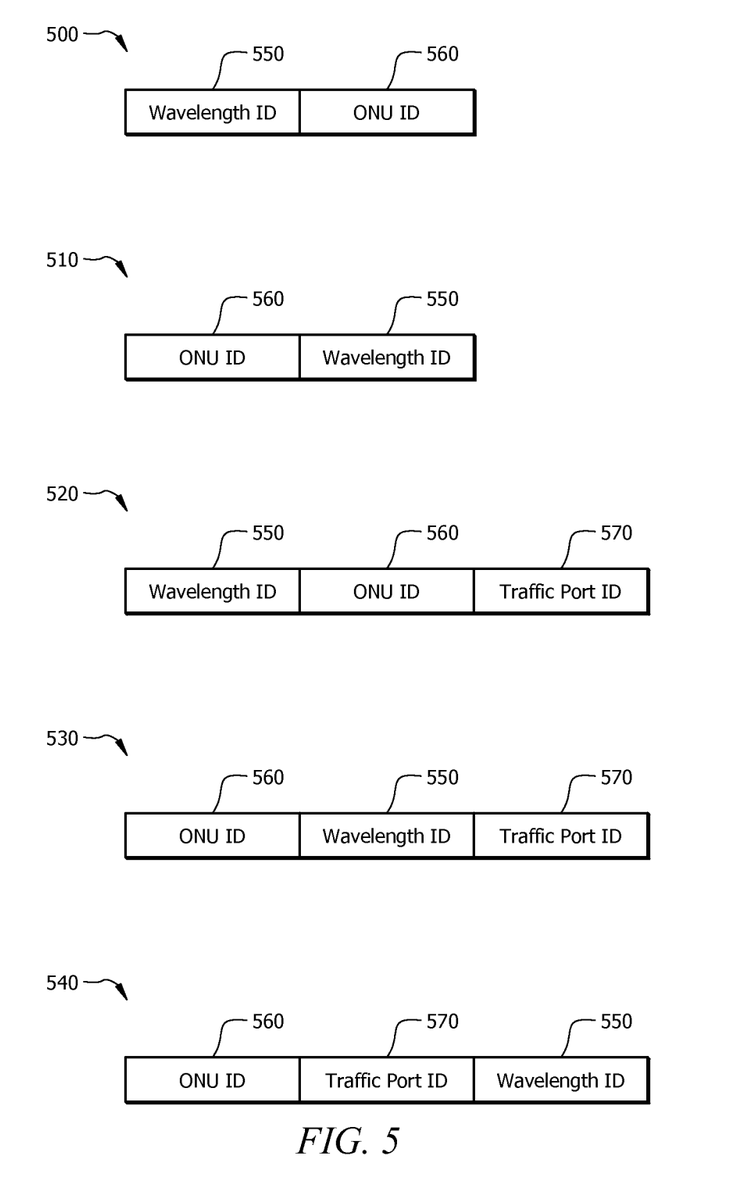
FIG. 5 is a diagram illustrating five logical link IDs (LLIDs) according to embodiments of the disclosure.

FIG. 5 is a diagram illustrating five LLIDs 500, 510, 520, 530, and 540 according to embodiments of the disclosure. The LLIDs 500, 510, 520, 530, and 540 may be part of a transmission allocation, for instance a grant. Each of the LLIDs 500, 510, 520, 530, and 540 may comprise a wavelength ID field 550 and an ONU-ID field 560, and each of the LLIDs 520, 530, and 540 may comprise a traffic port or flow field 570. The LLID 500 may comprise the wavelength ID field 550 in a first of two locations, the LLID 510 may comprise the wavelength ID field 550 in a second of two locations, and the LLID 520 may comprise the wavelength ID field 550 in a first of three locations, the LLID 530 may comprise the wavelength ID field 550 in a second of three locations, and the LLID 540 may comprise the wavelength ID field 550 in a third of three locations. The LLIDs 500, 510, 520, 530, and 540 demonstrate five possible configurations for the wavelength ID field 550, the ONU-ID field 560, and the optional traffic port or flow ID field 570, but those fields may be reordered in any other suitable manner. The wavelength ID field 550 may be three bits in order to support eight wavelengths, or the wavelength ID field 550 may be less or more than three bits in order to support less or more than eight wavelengths. The LLIDs 500, 510, 520, 530, and 540 may be 16 bits, may be more than 16 bits in order to accommodate the addition of the wavelength ID field 430, or may be less than 16 bits.

The Alloc-ID and the LLID may be extended in various manners. In a first embodiment, an Alloc-ID or an LLID may be unique for traffic-bearing entities associated with each downstream wavelength. A traffic-bearing entity may be associated with a downstream wavelength when the traffic-bearing entity's transmission allocation is broadcasted via the downstream wavelength. For instance, in a TWDM PON, there may be at least four downstream wavelengths, and an Alloc-ID may be valid for only one of those downstream wavelengths. In other words, an Alloc-ID may be valid for only one ONU in the transmission allocation for the one downstream wavelength. As a result, the same Alloc-ID may be reused for each of the remaining wavelengths. Protocols based on G-PONs, XG-PONs, and other PONs may use a PON-ID to represent a wavelength or a channel associated with the wavelength. Protocols based on EPONs, 10G-EPONs, and other PONs may use a source address in an Ethernet packet to represent a wavelength or a channel associated with the wavelength.

In a second embodiment, an Alloc-ID or an LLID may be unique within each PON, for instance the PON 100. In other words, the PON 100 may not reuse an Alloc-ID or an LLID, even for different downstream wavelengths. Each traffic-bearing entity may therefore have a unique ID within the PON 100. This approach may, however, limit the number of traffic-bearing entities, and thus $ONUs_{1-n}$ $165_{1-n}$, that the PON 100 may support.

In a third embodiment, an Alloc-ID or an LLID may be unique for traffic-bearing entities associated with a subset of downstream wavelengths. This approach may facilitate dynamic wavelength and bandwidth assignment (DWBA) in the upstream wavelengths because the unique Alloc-ID or LLID may provide the $ONUs_{1-n}$ $165_{1-n}$ with immediate access to an upstream wavelength, regardless of which downstream wavelength the $ONUs_{1-n}$ $165_{1-n}$ are receiving at. This approach may support open access, or unbundling, when one WDMA PON is shared by multiple providers. Each provider may own a subset of wavelengths, so the uniqueness of an Alloc-ID or LLID with the subset of downstream wavelengths may facilitate DWBA.

The wavelength ID discussed above may be either a logical identification or a literal, or actual, identification of a wavelength or a channel associated with the wavelength. The identified wavelength may be an upstream wavelength that a traffic-bearing entity may transmit at. The OLT 110 may form the transmission allocation, including the ID structure, in the MAC module 115, and the $ONU_1$ $165_1$ may process the transmission allocation, including the ID structure, in the $MAC module_1$ $180_1$. The disclosed embodiments may apply to any multiple-wavelength networks. While Alloc-IDs and LLIDs are specifically discussed, the disclosed embodiments may apply to any transmission allocations and ID structures.

Figure 6:
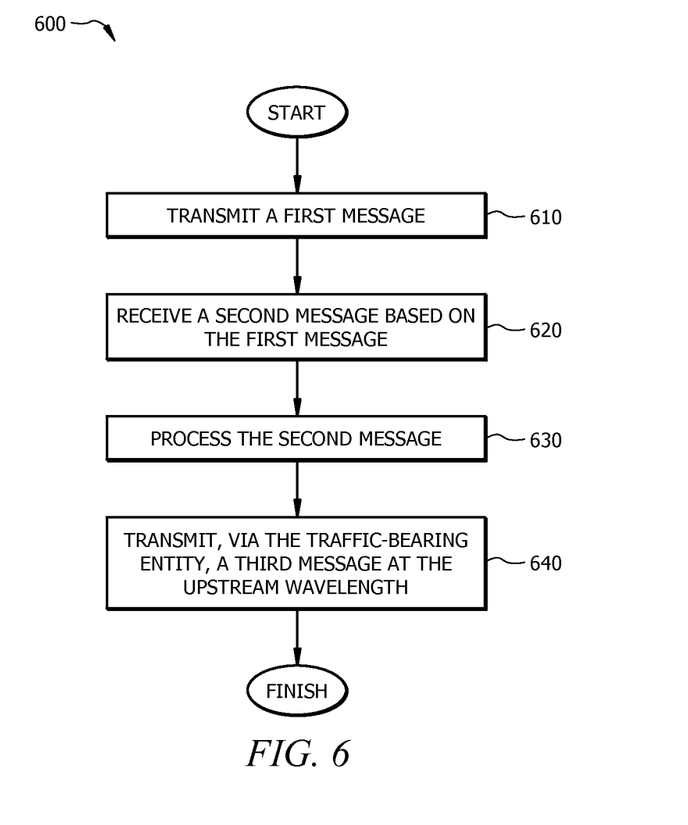
FIG. 6 is a flowchart illustrating a method of downstream reception and upstream transmission according to an embodiment of the disclosure.

FIG. 6 is a flowchart illustrating a method 600 of downstream reception and upstream transmission according to an embodiment of the disclosure. The method 600 may be implemented in an $ONU_{1-n}$ $165_{1-n}$, for instance the $ONU_1$ $165_1$. At step 610, a first message may be transmitted. For instance, the first message may be a registration message that the $ONU_1$ $165_1$ transmits to the OLT 110. At step 620, a second message may be received. The second message may be based on the first message. For instance, the second message may be a transmission allocation that the $ONU_1$ $165_1$ receives from the OLT 110. At step 630, the second message may be processed. For instance, the $ONU_1$ $165_1$ may process the second message in the $MAC module_1$ $180_1$. The second message may comprise an ID structure identifying a traffic-bearing entity associated with the $ONU_1$ $165_1$. The ID structure may comprise a wavelength ID field identifying an upstream wavelength that the traffic-bearing entity can transmit at. At step 640, a third message may be transmitted at the upstream wavelength. For instance, the $ONU_1$ $165_1$ may transmit, to the OLT 110 and via the traffic-bearing entity, a message comprising user data.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiments of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical line terminal (OLT) comprising:
a receiver configured to receive a first message;
a processor coupled to the receiver and configured to:
process the first message,
represent as a traffic-bearing entity a group of logical connections that appear as a single entity for a purpose of upstream bandwidth assignment in a passive optical network (PON),
identify the traffic-bearing entity as an object of an optical network unit (ONU),
assign a traffic-bearing entity identification to the traffic-bearing entity based on whether the traffic-bearing entity is an ONU management and control channel (OMCC) traffic-bearing entity or a non-OMCC traffic-bearing entity, and
generate a second message based on the first message, wherein the second message comprises an identification (ID) structure identifying the traffic-bearing entity, and wherein the ID structure comprises a wavelength ID field and the traffic-bearing entity identification; and
a transmitter coupled to the processor and configured to transmit the second message.

2. The OLT of claim 1, wherein the second message conforms to a gigabit-capable passive optical network (G-PON) standard or a 10-gigabit-capable passive optical network (X G-PON) standard.

3. The OLT of claim 2, wherein the wavelength ID field identifies an upstream wavelength that the traffic-bearing entity can transmit at, wherein the ID structure is an allocation ID (Alloc-ID) further comprising an ONU-ID field and a traffic container ID (T-CONT ID) field, wherein the ONU-ID field uniquely identifies the ONU within a passive optical network (PON), and wherein the T-CONT ID field is the traffic-bearing entity identification and uniquely identifies the traffic-bearing entity within the ONU.

4. The OLT of claim 3, wherein the Alloc-ID is 14 bits, wherein the wavelength ID field is three bits and is a first field in the Alloc-ID, wherein the ONU-ID field is x bits and is a second field in the Alloc-ID, wherein the T-CONT ID field is y bits and is a third field in the Alloc-ID, and wherein a sum of x and y is 11.

5. The OLT of claim 1, wherein the second message conforms to an Ethernet passive optical network (EPON) standard or a 10-gigabit-capable Ethernet passive optical network (10G-EPON) standard.

6. The OLT of claim 5, wherein the wavelength ID field identifies an upstream wavelength that the traffic-bearing entity can transmit at, wherein the ID structure is a logical link ID (LLID) further comprising an ONU-ID field and a traffic port or flow ID field, wherein the ONU-ID field uniquely identifies the ONU within a passive optical network (PON), and wherein the traffic port or flow ID field is the traffic-bearing entity identification and uniquely identifies the traffic-bearing entity within the ONU.

7. The OLT of claim 1, wherein the first message is a registration message.

8. The OLT of claim 1, wherein the second message is a transmission allocation.

9. The OLT of claim 8, wherein the transmission allocation is a bandwidth map (BWmap).

10. The OLT of claim 1, wherein the wavelength ID field comprises a logical ID of an upstream wavelength or a channel associated with the upstream wavelength.

11. The OLT of claim 1, wherein the wavelength ID field comprises a literal ID of an upstream wavelength or a channel associated with the upstream wavelength.

12. The OLT of claim 1, wherein the ID structure is a function of a wavelength ID, an ONU ID, and a transmission container (T-CONT) ID, and wherein the T-CONT ID is the traffic-bearing entity identification.

13. An optical network unit (ONU) comprising:
a group of logical connections that appear as a single entity for a purpose of upstream bandwidth assignment in a passive optical network (PON);
a traffic-bearing entity that is an object of the ONU and represents the group;
a transmitter configured to transmit a first message;
a receiver configured to receive a second message based on the first message; and
a processor coupled to the transmitter and the receiver and configured to process the second message,
wherein the second message comprises an identification (ID) structure identifying the traffic-bearing entity, and
wherein the ID structure comprises a wavelength ID field and a traffic-bearing entity identification assigned to the traffic-bearing entity based on whether the traffic-bearing entity is an ONU management and control channel (OMCC) traffic-bearing entity or a non-OMCC traffic-bearing entity.

14. The ONU of claim 13, wherein the ID structure is unique for each downstream wavelength in the PON.

15. The ONU of claim 13, wherein the ID structure is unique within the PON.

16. The ONU of claim 13, wherein the ID structure is unique for each subset of downstream wavelengths in the PON.

17. The ONU of claim 13, wherein the wavelength ID field identifies an upstream wavelength that the traffic-bearing entity can transmit at, wherein the first message is a registration message, and wherein the second message is a transmission allocation.

18. A method comprising:
transmitting a first message;
receiving a second message based on the first message;
processing the second message, wherein the second message comprises an identification (ID) structure identifying a traffic-bearing entity associated with an optical network unit(ONU), wherein the traffic-bearing entity is an object of the ONU and represents a group of logical connections that appear as a single entity for a purpose of upstream bandwidth assignment in a passive optical network (PON), and wherein the II) structure comprises a wavelength ID field identifying an upstream wavelength at which the traffic-bearing entity can transmit and a traffic-bearing entity identification assigned to the traffic-bearing entity based on whether the traffic-bearing entity is an ONU management and control channel (OMCC) traffic-bearing entity or a non-OMCC traffic-bearing entity; and transmitting, via the traffic-hearing entity, a third message at the upstream wavelength.

19. The method of claim 18, wherein the ID structure further comprises an ONU-ID field and a traffic-bearing entity ID field, wherein the ONU-ED field uniquely identifies the ONU within the PON, and wherein the traffic-bearing entity ID field is the traffic-bearing entity identification and uniquely identifies the traffic-bearing entity within the ONU.

20. The method of claim 18, wherein the first message is a registration message, the second message is a transmission allocation, and the third message comprises user data.

21. An optical line terminal (our) comprising:
a receiver configured to receive a request registration message from an optical network unit (ONU);
a processor coupled to the receiver and configured to:
assign an ONU identification (ONU-ID) to the ONU,
identify a traffic-bearing entity of the ONU,
assign an allocation identification (Alloc-Il)) to the ONU, wherein the Alloc-ID is unique within a time and wavelength division multiplexing passive optical network (TWDM PON),
assign a traffic-bearing entity identification to the traffic-bearing entity based on whether the traffic-bearing entity is an ONU management and control channel (OMCC) traffic-bearing entity or a non-OMCC traffic-bearing entity, and
generate, in response to the request registration message, an Alloc-ID message comprising an ONU-ID field and an Alloc-ID scope field, wherein the ONU-ID field comprises the ONU-ID and the Alloc-ID scope field comprises the Alloc-ID; and
a transmitter coupled to the processor and configured to transmit, in response to the request registration message, the Alloc-ID message to the ONU.

22. An optical network unit (ONU) comprising:
a traffic-bearing entity;
a transmitter configured to transmit a request registration message to an optical line terminal (OLT); and
a receiver configured to receive, in response to the request registration message, an assign allocation identification (Alloc-ID) message comprising:
an ONU identification (ONU-ID) field comprising an ONU-ID identifying the ONU,
an Alloc-ID scope field comprising an Alloc-ID that is assigned to the ONU and unique within a time and wavelength division multiplexing passive optical network (TWDM PON), and
a traffic-bearing entity identification assigned to the traffic-bearing entity based on whether the traffic-bearing entity is an ONU management and control channel (OMCC) traffic-bearing entity or a non-OMCC traffic-bearing entity,
wherein the transmitter is further configured to transmit subsequent messages at an upstream wavelength based on the Alloc-TD.

* * * * *

UNITED STATES PATENT AND TRADEMARK OFFICE
CERTIFICATE OF CORRECTION

PATENT NO. : 9,667,376 B2
APPLICATION NO. : 14/460892
DATED : May 30, 2017
INVENTOR(S) : Yuanqiu Luo et al.

It is certified that error appears in the above-identified patent and that said Letters Patent is hereby corrected as shown below:

In the Claims

Column 12, Lines 53-67, through Column 13, Lines 1-5, Claim 18, should read:
18. A method comprising:
    transmitting a first message;
    receiving a second message based on the first message;
    processing the second message, wherein the second message comprises an identification (ID) structure identifying a traffic-bearing entity associated with an optical network unit (ONU), wherein the traffic-bearing entity is an object of the ONU and represents a group of logical connections that appear as a single entity for a purpose of upstream bandwidth assignment in a passive optical network (PON), and wherein the ID structure comprises a wavelength ID field identifying an upstream wavelength at which the traffic-bearing entity can transmit and a traffic-bearing entity identification assigned to the traffic-bearing entity based on a whether the traffic-bearing entity is an ONU management and control channel (OMCC) traffic-bearing entity or a non-OMCC traffic-bearing entity; and
    transmitting, via the traffic-bearing entity, a third message at the upstream wavelength.

Column 13, Lines 6-12, Claim 19, should read:
19. The method of claim 18, wherein the ID structure further comprises an ONU-ID field and a traffic-bearing entity ID field, wherein the ONU-ID field uniquely identifies the ONU within the PON, and wherein the traffic-bearing entity ID field is the traffic-bearing entity identification and uniquely identifies the traffic-bearing entity within the ONU.

Column 13, Lines 17-30, through Column 14, Lines 1-8, Claim 21, should read:
21. An optical line terminal (OLT) comprising:
    a receiver configured to receive a request registration message from an optical network unit (ONU);
    a processor coupled to the receiver and configured to:
        assign an ONU identification (ONU-ID) to the ONU,
identify a traffic-bearing entity of the ONU, Signed and Sealed this
Twenty-sixth Day of December, 2017

Joseph Matal
*Performing the Functions and Duties of the
Under Secretary of Commerce for Intellectual Property and
Director of the United States Patent and Trademark Office* assign an allocation identification (Alloc-ID) to the ONU, wherein the Alloc-ID is unique within a time and wavelength division multiplexing passive optical network (TWDM PON), assign a traffic-bearing entity identification to the traffic-bearing entity based on whether the traffic-bearing entity is an ONU management and control channel (OMCC) traffic-bearing entity or a non-OMCC traffic-bearing entity, and generate, in response to the request registration message, an Alloc-ID message comprising an ONU-ID field and an Alloc-ID scope field, wherein the ONU-ID field comprises the ONU-ID and the Alloc-ID scope field comprises the Alloc-ID; and a transmitter coupled to the processor and configured to transmit, in response to the request registration message, the Alloc-ID message to the ONU.